United States Patent [19]

Ernst et al.

[11] 4,293,166
[45] Oct. 6, 1981

[54] ROLLING BEARING FOR RELATIVE LINEAR MOVEMENT ON A SHAFT

[75] Inventors: Horst M. Ernst, Eltingshausen; Armin Olschewski, Schweinfurt; Rainer Schürger, Schwanfeld; Lothar Walter, Schweinfurt; Manfred Brandenstein, Aschfeld; Erich Burkl, Stammheim, all of Fed. Rep. of Germany

[73] Assignee: SKF Kugellagerfabriken GmbH, Schweinfurt, Fed. Rep. of Germany

[21] Appl. No.: 135,317

[22] Filed: Mar. 31, 1980

Related U.S. Application Data

[63] Continuation of Ser. No. 925,947, Jul. 19, 1978, abandoned.

[30] Foreign Application Priority Data

Aug. 23, 1977 [DE] Fed. Rep. of Germany ......... 260312
Jul. 19, 1978 [DE] Fed. Rep. of Germany ......... 925947

[51] Int. Cl.³ .............................................. F16C 29/06
[52] U.S. Cl. .......................................................... 308/6 C
[58] Field of Search ................ 308/6 C, 206, 215, 217

[56] References Cited

U.S. PATENT DOCUMENTS

| 3,086,824 | 4/1963 | Barkley | 308/6 C |
| 3,230,018 | 1/1966 | Stallman | 308/6 C |
| 3,360,308 | 12/1967 | Grabowski et al. | 308/6 C |
| 3,466,101 | 9/1969 | Hudson | 308/6 C |
| 3,606,499 | 9/1971 | Ganser et al. | 308/6 C |
| 3,704,919 | 12/1972 | Titt | 308/6 C |

FOREIGN PATENT DOCUMENTS

| 211549 | 7/1909 | Fed. Rep. of Germany | 308/206 |
| 1949735 | 4/1970 | Fed. Rep. of Germany | 308/6 C |

*Primary Examiner*—Richard R. Stearns
*Attorney, Agent, or Firm*—Daniel M. Rosen

[57] ABSTRACT

In a rolling bearing for longitudinal movement with respect to a shaft, the rolling elements have longitudinal cross sections with concave central sections adapted to engage a cylindrical machine element, and shaped ends adapted to roll on a support surface of the machine element. The bearing includes a shell structure for guiding the rolling elements to follow continuous pathways. Each pair of adjacent rolling elements are separated from contact with one another by a separating roller having a convex longitudinal cross section which engages the concave portions of the rolling elements with line contact.

12 Claims, 4 Drawing Figures

ROLLING BEARING FOR RELATIVE LINEAR MOVEMENT ON A SHAFT

This is a continuation, of application Ser. No. 925,947, filed July 19, 1978, now abandoned.

BACKGROUND OF THE INVENTION

This invention relates to a rolling bearing for relative linear movement between the bearing and a cylindrical machine element, such as a shaft. The rolling bearing has several continuous courses of spool shaped rollers distributed about the circumference of a multi-part annular body, and the rolling elements have concave rolling surfaces.

A known rolling bearing of this type is formed of several segments assembled together, each of which has a continuous course of rolling elements with concave rolling surfaces. The rolling bodies have cylindrical pins on each of their ends, these pins engaging endless guide grooves. This arrangement does not ensure completely satisfactory running of the rolling elements, since on the one hand the rolling bodies are not guided positively to maintain their longitudinal axes normal to the running direction, and on the other hand since, due to their loose arrangement with respect to one another, can contact one another to result in the production of undesired noise.

Another known rolling bearing for relative linear movement, employs spool shaped rolling bodies, having half barrel shaped pins on their ends. The rolling elements are held by these pins at equal distances from one another by an endless chain-type band. As a result, the guiding of the rolling bodies with a band of this type is relatively expensive, and the rolling of the rolling bodies unfavorably influences the friction between the rolling bodies and the individual links of the band.

A still further known rolling bearing has only one continuous course of cylindrical rolling bodies, this bearing being adaptable for use between a pair of parallel surfaces to enable relative linear movement therebetween. In this bearing arrangement, the rolling bodies are provided with cylindrical pins on both ends, the pins engaging endless guide grooves. Spacing balls are arranged in the grooves between the pins in order to minimize the above-mentioned friction between adjacent rolling bodies.

SUMMARY OF THE INVENTION

The invention is thereby directed to the provision of a rolling bearing for relative linear movement with respect to a shaft, of the above described type, wherein the production of friction and noise is minimized. In addition, the invention is directed to a rolling bearing of the above type that can be attained by employing a construction that is favorable to manufacturing techniques.

Briefly stated, in accordance with the invention, the above objectives are attained in a simple manner, by arranging barrel shaped guide rollers to float between the spool shaped rolling elements, the guide rollers being shaped to have line contact with the adjacent rolling bodies. As a result, only rolling friction exists between the rolling bodies and the guide rollers, thereby promoting the ease of movement of the rolling bearing. In addition, the guide rollers act to avoid angular positioning of the rolling elements as well as the sidewise displacement of these elements, so that the exact guiding of the rolling body inside of the recesses of the guide slots is not necessary, so that the production costs of the rolling bearing is favorably influenced as a result.

In the arrangement of the invention the floating arrangement of the guide rollers is attained in a simple manner, by dimensioning the guide rollers so that the distance between the longitudinal axes of adjacent rolling elements is smaller than the sum of the distances between these longitudinal axes and the longitudinal axis of an intervening guide roller. As a result, the guide roller can have a length about the same as that of the rolling element, or it can have a length substantially equal to the rolling surface section of the rolling element.

The barrel shaped guide rollers can advantageously be employed in a rolling bearing for linear movement with respect to a shaft, wherein an annular multi-part base is employed having an outer shell and a support shell coaxially positioned therein, and wherein the inner surface of the support shell serves as a race for the support of the loaded rolling elements and the outer surface sections of the support shell serve as linear races for the return course of unloaded rolling elements located in return guide grooves in this region in the outer shell. A rolling bearing of this type is generally shown in the German application DT-OS No. 1.961,468. According to the present invention, however, the barrel shaped guide rollers are further provided. In addition, a cage is provided in the annular space between the cylindrical machine element and the support shell, the cage having axially extending ribs between which the cylindrical machine elements are laterally guided, while the end sections of the cage are formed as cover rings having half circular or turn around races for the rolling elements, on their insides.

A cage structure of this type can be easily produced, and it is advantageous to produce the cage from two symmetrical annular halves adapted to be connected together. Since the rolling elements are held to extend at right angle positions to the running direction, by means of the guide rollers, the axial running ribs of the cage assume only a lateral guiding of the rolling elements. In order that the rolling bodies and for example also the guide rollers of the same length do not fall out of the rolling bearing in the radial direction in the assembly, in accordance with a further embodiment of the invention the ribs have segmental cross sections and are provided with axially extending guides on their inner edges, these edges extending partways under the rolling bodies. In addition, it is also possible to form the side surfaces of the axially extending ribs with flat surfaces, and to provide a mounting shell in the hole of the cage as an assembly aid. Such an assembly shell prevents the rolling elements and the guide rollers from radially falling out from inside of the cage. The mounting shell is pushed out from the rolling bearing by a shaft as the cage is shoved over the shaft, the shaft thereafter preventing the rolling elements and guide rollers from falling out of the cage.

BRIEF FIGURE DESCRIPTION

In order that the invention will be more clearly understood, it will now be disclosed in greater detail with reference to the accompanying drawings, wherein.

DETAILED DISCLOSURE OF THE INVENTION

Figure 1:
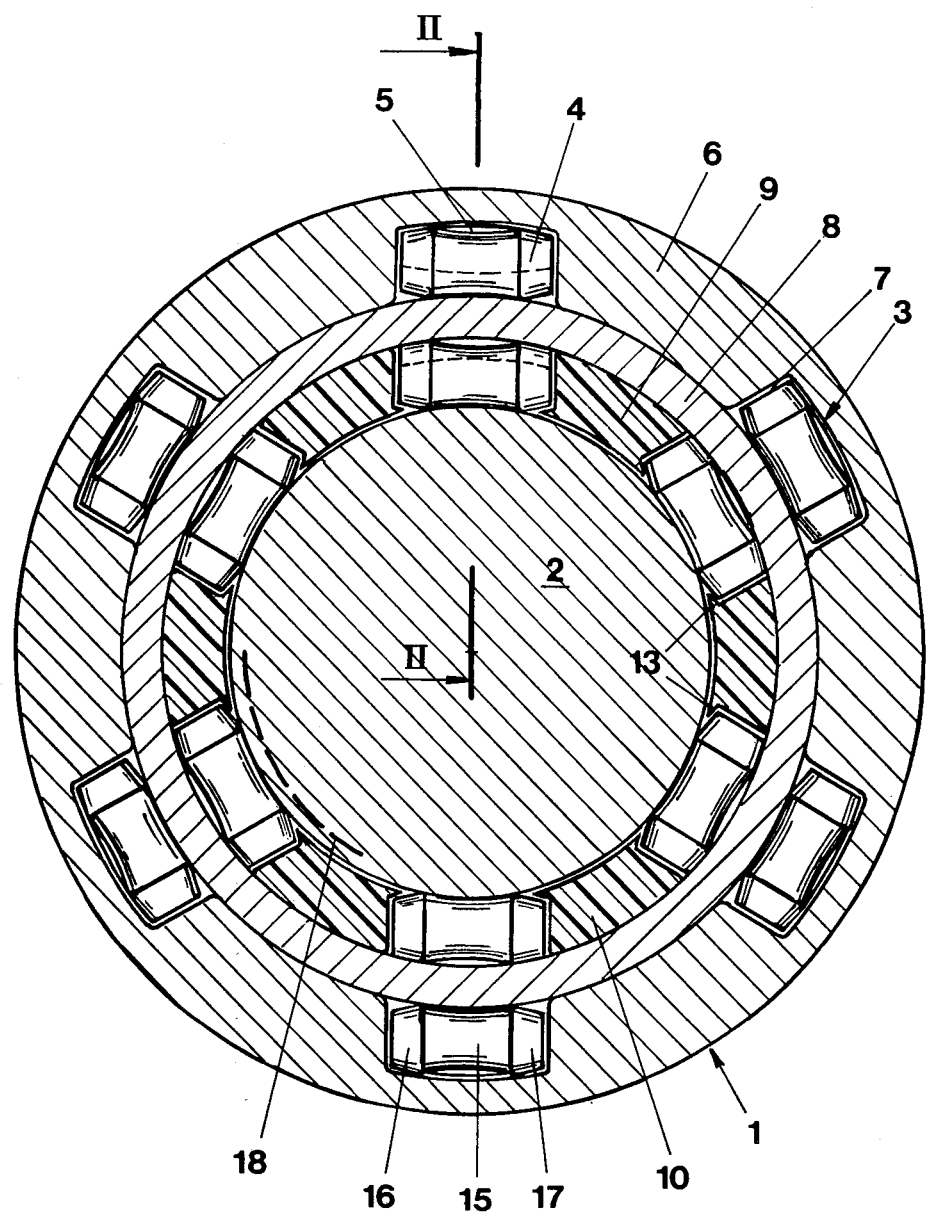
FIG. 1 is a cross sectional view of the rolling bearing and shaft mounted therein in accordance with one embodiment of the invention.

Referring now to the drawings, the illustrated rolling bearing is comprised of a multi-part annular element 1 adapted to be mounted for relative axial movement with respect to a central shaft 2. The annular element 1 has several closed continuous races 3 distributed equally about its circumference, and spool shaped rolling bodies 4 are arranged to circulate in these races. Barrel shaped guide rollers 5 or 5' are arranged between adjacent rolling bodies 4. The annular element 1 is comprised of an outer housing 6 with return race grooves 7, a support housing 8 coaxially positioned within the outer housing 6, and a cage 9 positioned in the annular space between the shaft 2 and the support housing 8. The cage 9 may be formed from two symmetrical halves, and has axially extending ribs 10, 10' between which the rolling bodies in contact with the shaft 2 are laterally guided. The cage also is formed with cover ring end sections 11, 11', which include half circular turn-around races 12, 12'. The ribs 10, 10' of the cage 9 are, in cross section, essentially segmental, and have axially extending guides 13 (13' not shown) on their inner lying edges, which extend partly under the rolling bodies 4. The cover ring end sections 11, 11' of the cage 9 have circumferentially extending protrusions 14, 14' (see FIG. 2) in order to hold the cage in the outer housing 6, the protrusions 14 extending into similar shaped recesses in the housing 6. It is also of course possible to hold the cage in the structure by other known holding techniques, such as by gluing or ultrasonic welding.

Figure 3:
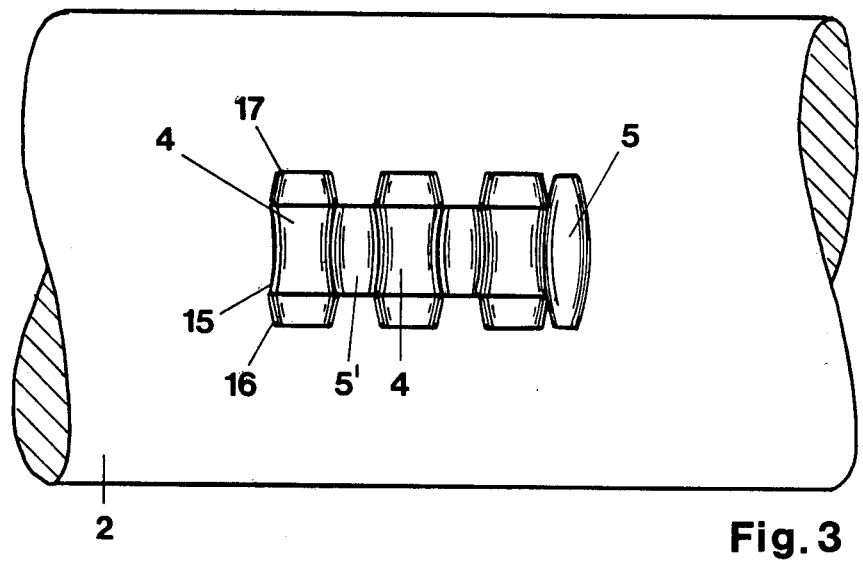
FIG. 3 is a schematic illustration showing the rolling elements of the rolling bearing of FIG. 1 positioned along a shaft, and further illustrating two different forms of guide rollers that may be employed in accordance with the invention.

The rolling bodies 4 have central concave rolling surfaces 15, as illustrated in FIGS. 1 and 3, and pins 16 and 17 on the ends of the concave surface 15. The circumferential surfaces of the pins 16 and 17 are curved to correspond to the inner diameter of the support housing 8. The guide rollers 5 or 5' are arranged between the rolling bodies 4, and, due to the barrel shapes of these elements, they are in line contact with the adjacent rolling bodies 4.

FIG. 3 shows two different types of guide rollers. The guide rollers 5 have about the same length as the rolling bodies 4, whereas the guide rollers 5' have lengths substantially equal only to the central concave rolling surfaces of the rolling bodies 4.

Figure 4:
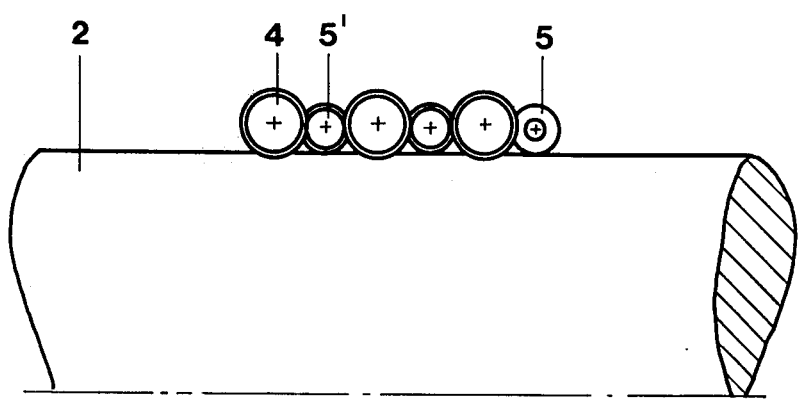
FIG. 4 is a side view of the schematic illustration of FIG. 3, showing the end views of the rolling elements and the guide rollers.

The rolling bodies 5 and 5' are arranged between the rolling bodies 4 in such a manner that the distance between the longitudinal axis of two adjacent rolling bodies 4 is less than the sum of the distances between these axes and the longitudinal axes of the guide rollers 5 or 5' respectively, as is evident in FIG. 4.

FIG. 1 also shows a mounting shell 18 (in dash lines) in the hole of the cage 9, to prevent the falling out of the guide rollers 5 or 5', as well as the rolling bodies 4, from the rolling bearing in the noninstalled condition of the bearings, in the event that the axially extending ribs 13 of the cage 9 are not provided.

The individual continuous races for the rolling bodies 4 and guide rollers 5 and 5' have straight outer sections, forming return grooves 7 for rollers that are not under load, and straight axially extending inner sections between pairs of opposite ribs 10, 10' of the cage 9, and appropriate turn-around races 12, 12'. As a consequence, a part of the inner surface of the support housing 8 serves in each case as a linear raceway course for the support of the loaded rolling bodies 4 by means of its pins 16 and 17 and a part of the outer surface of the support housing 8 serves as a race for the return course of the rolling bodies that are not under load.

The outer housing 6 as well as the cage 9 preferably are comprised of a plastic material, with the support shell 8 being formed of steel. It is of course possible to employ other materials for these components of the rolling bearing of the invention.

Figure 2:
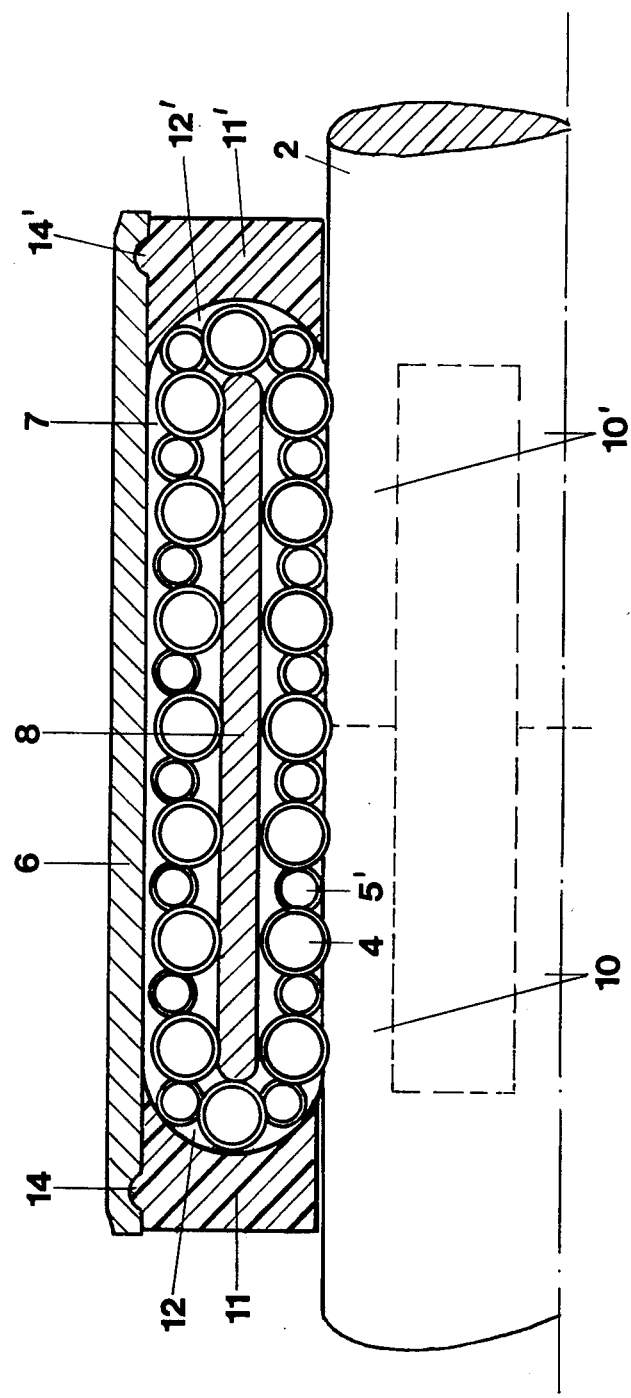
FIG. 2 is a lengthwise cross sectional view of a rolling bearing in accordance with the invention, taken along the lines II—II of FIG. 1.

In accordance with the invention, as above-described, the term "concave" refers to the shape of the rolling elements, wherein the central portions of the longitudinal cross sections of these elements are concave. In a similar manner, the barrel shaped separating rollers 5, 5' have convex cross sections, since their the longitudinal cross sections are at least partially convex to engage the concave surfaces of the rolling elements. As indicated in FIG. 4 of the drawings, the barrel shaped separating rollers 5, 5' may contact the cylindrical surface of the shaft, whereby these elements follow paths contiguous with the outer dimensions of the continuous pathways for the rolling elements 4, as illustrated in FIG. 2. It will be apparent, however, that the bearing of the invention is not limited to the specific arrangement.

While the invention has been disclosed and described with reference to a limited number of embodiments, it will be apparent that variations and modifications may be made therein, and it is intended in the following claims to cover each such variation and modification as follows within the true spirit and scope of the invention.

We claim:

1. In a rolling bearing for relative linear movement between the bearing and a cylindrical machine element, with several continuous courses of spool shaped rolling bodies distributed about the circumference of a multi-part annular body, the improvement wherein barrel shaped guide rollers are positioned to float between the spool shaped rolling bodies, the guide rollers held in continuous line contact with the roll surfaces of adjacent rolling bodies, the distance between the longitudinal axes of adjacent rolling bodies being less than the sum of the distances between the longitudinal axis of a guide roller between said adjacent rolling bodies and the longitudinal axes of said adjacent rolling bodies continuously throughout said courses.

2. The rolling bearing of claim 1 wherein the guide rollers have substantially the same length as the rolling bodies.

3. The rolling bearing of claim 1 wherein the guide rollers have lengths substantially equal to the roll surface sections of the rolling bodies.

4. The rolling bearing of claim 1, wherein the annular body includes an outer shell and a support shell positioned coaxially therein, the inner surface of the support shell serving as a linear race for the support of rolling bodies under load and the outer surface of the support shell serving as a linear race for the return of unloaded rolling bodies in return guide grooves in the outer shell, and further comprising a cage in the annular space between the cylindrical machine element and the support shell said cage having axially extending ribs for guiding the rolling bodies to contact the cylindrical machine element, the axial end sections of the cage comprising end cover rings with inner semicircular return races for the rolling bodies.

5. The rolling bearing of claim 4 wherein said cage is comprised of a pair of symmetrical annular halves.

6. The rolling bearing of claim 4 wherein said ribs are substantially segmental in cross section and have axially extending guides on their inner edges, said guides extending partway under the rolling bodies.

7. The rolling bearing of claim 4 comprising a removable mounting shell positioned in the hole of said cage.

8. In a rolling bearing for linear movement with respect to a machine element having a cylindrical surface, wherein a plurality of rolling elements are mounted to engage said surface, the central portions of the rolling elements having longitudinal cross sections with concave central portions, and the rolling bearing having means for guiding said rolling elements to follow a continuous path including radially aligned linear path sections for loaded and unloaded elements separated by a cylindrical shell and joined by semicircular turn-around path sections; the improvement wherein said bearing further comprises a plurality of separating rollers having convex longitudinal cross section adapted to engage the concave regions of said rolling elements in mutually continuous line contact, with one of said separating rollers between each pair of adjacent rolling elements and separating said rolling elements from mutual contact, the axes of said rolling elements and separating rollers being parallel, the distances between axes of adjacent rolling elements being less than the sum of the distances between the axis of the roller between said adjacent elements and the axes of said adjacent rolling elements continuously throughout said course.

9. The rolling bearing of claim 8 comprising an outer shell, an inner shell coaxially positioned in said outer shell whereby said shells define a pathway for unloaded rolling elements, and a cage within said inner shell and coaxial therewith, said cage defining a pathway for loaded rolling elements and turn-around paths for said rolling elements.

10. The rolling bearing of claim 8 wherein the end portions of said rolling elements adjoining said central portions have a convex curvature in the longitudinal cross section to match and engage the curvature of the inner surface of said shell, the axial ends of said rolling elements being flat and in a plane normal to the axes of said rolling elements, the axial ends of said roller being flat and in a plane normal to the axes of said rollers, said convex longitudinal cross section of said rollers terminating at said flat ends of said rollers.

11. In a rolling bearing for linear movement with respect to a machine element having a cylindrical surface, wherein a plurality of rolling elements are mounted to engage said surface, the central portions of the rolling elements having longitudinal cross sections with concave central portions, and the rolling bearing having means for guiding said rolling elements to follow a continuous path including radially aligned linear path sections for loaded and unloaded elements separated by a cylindrical shell and joined by semicircular turn-around path sections; the improvement wherein said bearing further comprises a plurality of separating rollers having convex longitudinal cross section adapted to engage the concave regions of said rolling elements in line contact, with one of said separating rollers between each pair of adjacent rolling elements and separating said rolling elements from mutual contact, the axes of said rolling elements and separating rollers being parallel, the distances between axes of adjacent rolling elements being less than the sum of the distances between the axis of the roller between said adjacent elements and the axes of said adjacent rolling elements continuously throughout said courses, wherein said rolling elements and rollers are packed to hold the axes of said rollers closer to said machine element than the axes of said rolling elements in said linear path for loaded elements and to hold the axes of said rollers further from said machine elements than the axes of said rolling elements in said linear path for unloaded elements.

12. In a rolling bearing for linear movement with respect to a machine element having a cylindrical surface, wherein a plurality of rolling elements are mounted to engage said surface, the central portions of the rolling elements having longitudinal cross sections with concave central portions, and the rolling bearing having means for guiding said rolling elements to follow a continuous path including linear path sections for loaded and unloaded elements joined by turn-around path sections; the improvement wherein said bearing further comprises a plurality of separating rollers having convex longitudinal cross section adapted to engage the concave regions of said rolling elements in mutually continuous line contact, with one of said separating rollers between each pair of adjacent rolling elements and separating said rolling elements from mutual contact, the axes of said rolling elements and separating rollers being parallel, wherein said rolling elements and rollers are packed to hold the axes of said rollers closer to said machine element than the axes of said rolling elements in said linear path for loaded elements and to hold the axes of said rollers further from said machine element than the axes of said rolling elements in said linear path for unloaded elements.

* * * * *